H. E. FOWLER.
MACHINE FOR SEPARATING TINNED AND GALVANIZED ARTICLES OF METAL.

No. 68,357. Patented Sept. 3, 1867.

Witnesses:
Chas. H. Smith
Geo. D. Walker

Inventor:
Herbert E. Fowler
per L. W. Serrell
Atty.

United States Patent Office.

HERBERT E. FOWLER, OF WOLCOTTVILLE, CONNECTICUT.

Letters Patent No. 68,357, dated September 3, 1867.

---

IMPROVED MACHINE FOR SEPARATING TINNED AND GALVANIZED ARTICLES OF METAL.

---

The Schedule referred to in these Letters Patent and making part of the same.

---

TO ALL WHOM IT MAY CONCERN:

Be it known that I, HERBERT E. FOWLER, of Wolcottville, in the county of Litchfield, and State of Connecticut, have invented, made, and applied to use a certain new and useful Improvement in Separating Tinned or Galvanized Articles of Metal; and I do hereby declare the following to be a full, clear, and exact description of the said invention, reference being had to the annexed drawing, making part of this specification, wherein—

Figure 1:
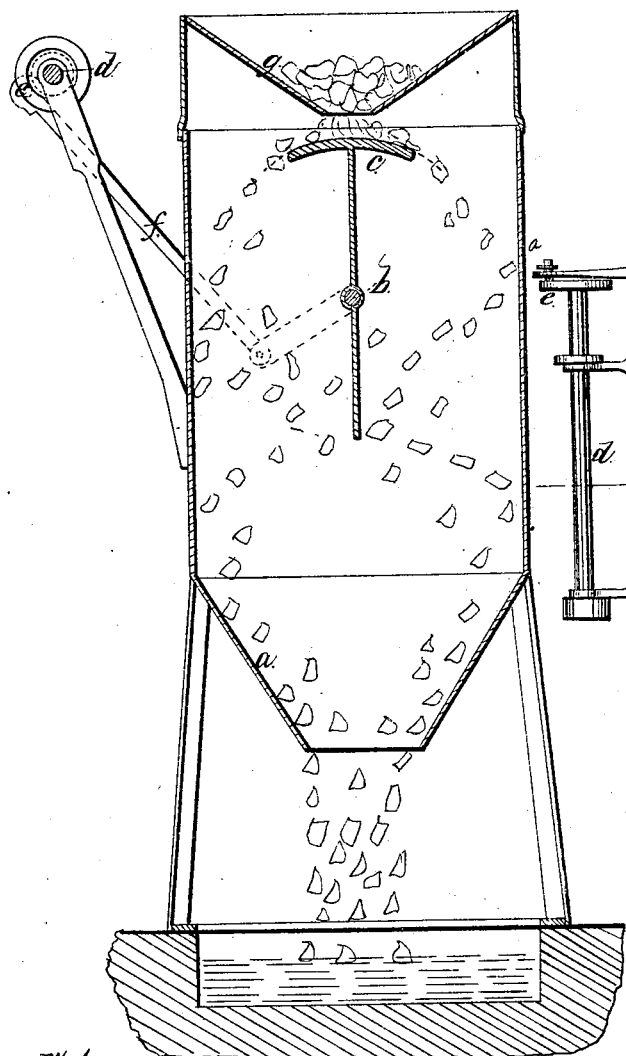
Figure 2:
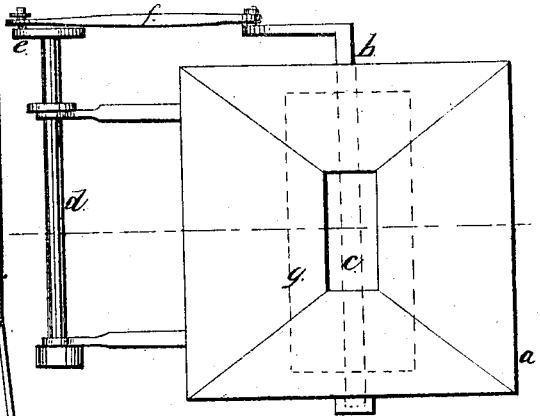

Figure 1 is a vertical section of my machine for separating tinned or galvanized articles of metal, and Figure 2 is a plan of the same.

The same parts are indicated by corresponding letters.

After articles, such as buckles, pins, &c., have been dipped in melted coating-metal, or coated by a small quantity of the coating-metal introduced in a heated and agitated vessel, the said articles have to be separated before the coating-metal cools, or said articles would become permanently connected together. Heretofore, this separation has been effected by a reciprocating riddle or shaker, or by revolving pins, but with such articles as buckle-tongues and frames the parts are apt to interlock and not separate, or else to clog upon the riddles or pins.

The nature of my said invention consists in a vibrating separator in combination with a hopper and case, said vibrating separator being formed as a swinging plate, flanged at the upper end, below the opening of the supply hopper, so as to sustain the articles to be separated, but pass them down gradually from the hopper, and by concussion cause the different pieces to separate and fall into water to cool them.

In the drawing, $a$ is a case, of suitable material, formed hopper-shape at the bottom, and receiving across it the axis $b$ of the vibrating separator plate $c$. $d$ is a shaft, rotated rapidly by competent power, and provided with a crank-pin, $e$, and connecting-rod, $f$, to the arm of the axis $b$, so that the separator $c$ is swung or vibrated with sufficient speed. $g$ is a hopper, with an opening under which the upper end of the separator $c$ vibrates, and said upper end of $c$ is flanged or made wider, so that the articles to be separated rest upon this upper end of the said separator and shake off the edge of the same, and, falling down, are knocked by the sides of said separator against the sides of the case, and rebounding, may be knocked several times, so that no two pieces remain together, and they finally fall away into a tub of water placed below the apparatus. The articles to be separated are represented by red lines as passing into the apparatus from the supply hopper $g$.

This improvement is especially adapted to the separation of buckle-tongues and bows, but may be used advantageously in the separation of pins, nails, and other small articles of metal, after they have been tinned or galvanized in any known manner.

What I claim, and desire to secure by Letters Patent, is—

The vibrating separator, fitted substantially as specified, in combination with the supply hopper, as and for he purposes set forth.

In witness whereof I have hereunto set my signature this first day of February, A. D. 1867.

H. E. FOWLER.

Witnesses:
   H. S. BARBOUR,
   MERWIN FOWLER.